US007424967B2

(12) United States Patent
Ervin et al.

(10) Patent No.: US 7,424,967 B2
(45) Date of Patent: Sep. 16, 2008

(54) METHOD FOR MANUFACTURE OF TRUSS CORE SANDWICH STRUCTURES AND RELATED STRUCTURES THEREOF

(75) Inventors: Kenneth D. Ervin, Johns Island, SC (US); Haydn N. G. Wadley, Keswick, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 737 days.

(21) Appl. No.: 10/526,296

(22) PCT Filed: Sep. 3, 2003

(86) PCT No.: PCT/US03/27606

§ 371 (c)(1),
(2), (4) Date: Mar. 1, 2005

(87) PCT Pub. No.: WO2004/022869

PCT Pub. Date: Mar. 18, 2004

(65) Prior Publication Data

US 2006/0163319 A1    Jul. 27, 2006

Related U.S. Application Data

(60) Provisional application No. 60/407,756, filed on Sep. 3, 2002.

(51) Int. Cl.
*B23K 28/00*    (2006.01)
(52) U.S. Cl. .......................... 228/193; 228/181; 428/116
(58) Field of Classification Search .................. 228/193, 228/118, 195, 194, 181; 428/586, 593, 660, 428/649, 668, 73, 116
See application file for complete search history.

(56) References Cited

U.S. PATENT DOCUMENTS 1,154,254 A      9/1915   Lachman (Continued)

FOREIGN PATENT DOCUMENTS

JP        1147294        6/1989

OTHER PUBLICATIONS

Wadley, "Manufacture of Cellular Metals: An Overview of Concepts for Stochastic and Periodic Materials," MetFoam 2001, (Jun. 18, 2001).

(Continued)

*Primary Examiner*—Kevin P Kerns
*Assistant Examiner*—Michael Aboagye
(74) *Attorney, Agent, or Firm*—Novak Druce DeLuca + Quigg LLP; Robert J. Decker

(57)    ABSTRACT

An embodiment provides a method of constructing a cellular structure having nodes therein comprising: providing at least one truss layer comprised of at least one truss unit, at least one of the truss units being comprised of truss members; providing at least one panel in mechanical communication with the at least one truss unit of the at least one truss layer, the mechanical communication defines contact regions wherein the at least one truss unit is coupled to the at least one panel; the nodes being defined as intersections existing among any of the truss members and the nodes also being defined by the contact regions; providing at least one node pin, the at least one node pin spanning between two desired the nodes; and diffusion bonding at least one of the truss layer to the at least one panel. The bonding includes: applying heat, and applying force that results in the truss layer and the panel that are being bonded to be pressed together, the node pins provide support for the structure so as to concentrate or transmit the applied force onto the contact regions.

38 Claims, 8 Drawing Sheets

U.S. PATENT DOCUMENTS

| | | |
|---|---|---|
| 2,288,104 A | 6/1942 | Pasquier |
| 2,481,046 A | 9/1949 | Scurlock |
| 2,789,076 A | 4/1957 | Frieder |
| 3,298,402 A | 1/1967 | Hale |
| 3,783,969 A | 1/1974 | Pall |
| 3,795,288 A | 3/1974 | Pall |
| 3,857,217 A | 12/1974 | Reps |
| 3,869,778 A | 3/1975 | Yancey |
| 3,971,072 A | 7/1976 | Armellino |
| 3,996,082 A | 12/1976 | Leatherman |
| 4,001,478 A | 1/1977 | King |
| 4,019,540 A | 4/1977 | Holman |
| 4,027,476 A | 6/1977 | Schmidt |
| 4,037,751 A | 7/1977 | Miller |
| 4,038,440 A | 7/1977 | King |
| 4,067,956 A | 1/1978 | Franklin |
| 4,130,233 A | 12/1978 | Chisholm |
| 4,194,255 A | 3/1980 | Poppe |
| 4,223,053 A | 9/1980 | Brogan |
| 4,291,732 A | 9/1981 | Artzer |
| 4,450,338 A | 5/1984 | Conn |
| 4,453,367 A | 6/1984 | Geyer |
| 4,469,077 A | 9/1984 | Wooldridge |
| 4,522,860 A | 6/1985 | Scott |
| 4,529,640 A | 7/1985 | Brown |
| 4,530,197 A | 7/1985 | Rainville |
| 4,531,511 A | 7/1985 | Hochberg |
| 4,625,710 A | 12/1986 | Harada |
| 4,632,716 A | 12/1986 | Smith |
| 4,639,388 A | 1/1987 | Ainsworth |
| 4,687,702 A | 8/1987 | Monsees |
| 4,756,943 A | 7/1988 | Koletzko |
| 4,758,299 A | 7/1988 | Burke |
| 4,765,396 A | 8/1988 | Seidenberg |
| 4,819,719 A | 4/1989 | Grote |
| 4,859,541 A | 8/1989 | Maxeiner |
| 4,883,116 A | 11/1989 | Seidenberg |
| 4,916,027 A | 4/1990 | Delmundo |
| 4,918,281 A | 4/1990 | Blair |
| 4,923,544 A | 5/1990 | Weisse |
| 4,955,135 A | 9/1990 | Pinkhasov |
| 4,968,367 A | 11/1990 | Diderich |
| 5,002,378 A | 3/1991 | Colarusso |
| 5,011,638 A | 4/1991 | Pinkhasov |
| 5,040,966 A | 8/1991 | Weisse |
| 5,070,673 A | 12/1991 | Weisse |
| 5,102,723 A | 4/1992 | Pepin |
| 5,110,661 A | 5/1992 | Groves |
| 5,137,058 A | 8/1992 | Anahara |
| 5,176,641 A | 1/1993 | Idriss |
| 5,179,043 A | 1/1993 | Weichold |
| 5,181,549 A | 1/1993 | Shapovalov |
| 5,190,539 A | 3/1993 | Fletcher |
| 5,217,770 A | 6/1993 | Morris |
| 5,219,020 A | 6/1993 | Akachi |
| 5,224,519 A | 7/1993 | Farley |
| 5,266,279 A | 11/1993 | Haerle |
| 5,282,861 A | 2/1994 | Kaplan |
| 5,308,669 A | 5/1994 | Prucher |
| 5,309,457 A | 5/1994 | Minch |
| 5,312,660 A | 5/1994 | Morris |
| 5,349,893 A | 9/1994 | Dunn |
| 5,360,500 A | 11/1994 | Evans |
| 5,401,583 A | 3/1995 | Stacher |
| 5,417,686 A | 5/1995 | Peterson |
| 5,424,139 A | 6/1995 | Shuler |
| 5,431,800 A | 7/1995 | Kirchhoff |
| 5,455,096 A | 10/1995 | Toni |
| 5,465,760 A | 11/1995 | Mohamed |
| 5,471,905 A | 12/1995 | Martin |
| 5,472,769 A | 12/1995 | Goerz |
| 5,503,887 A | 4/1996 | Diaz |
| 5,511,974 A | 4/1996 | Gordon |
| 5,527,588 A | 6/1996 | Camarda |
| 5,527,590 A | 6/1996 | Priluck |
| 5,534,314 A | 7/1996 | Wadley |
| 5,547,737 A | 8/1996 | Evans |
| 5,591,162 A | 1/1997 | Fletcher |
| 5,598,632 A | 2/1997 | Camarda |
| 5,605,628 A | 2/1997 | Davidson |
| 5,624,622 A | 4/1997 | Boyce |
| 5,642,776 A | 7/1997 | Meyer |
| 5,654,518 A | 8/1997 | Dobbs |
| 5,656,984 A | 8/1997 | Paradis |
| 5,673,571 A | 10/1997 | Moss |
| 5,677,029 A | 10/1997 | Prevorsek |
| 5,679,467 A | 10/1997 | Priluck |
| 5,698,282 A | 12/1997 | DeMeyer |
| 5,741,574 A | 4/1998 | Boyce |
| 5,771,488 A | 6/1998 | Honkala |
| 5,772,821 A | 6/1998 | Yasui |
| 5,773,121 A | 6/1998 | Meteer |
| 5,808,866 A | 9/1998 | Porter |
| 5,817,391 A | 10/1998 | Rock |
| 5,888,609 A | 3/1999 | Karttunen |
| 5,888,912 A | 3/1999 | Piemonte |
| 5,890,268 A | 4/1999 | Mullen |
| 5,924,459 A | 7/1999 | Evans |
| 5,943,543 A | 8/1999 | Uchida |
| 5,962,150 A | 10/1999 | Priluck |
| 5,970,843 A | 10/1999 | Strasser |
| 5,972,146 A | 10/1999 | Fantino |
| 5,972,468 A | 10/1999 | Welch |
| 6,003,591 A | 12/1999 | Campbell |
| 6,076,324 A | 6/2000 | Daily |
| 6,077,370 A | 6/2000 | Solvstev |
| 6,080,495 A | 6/2000 | Wright |
| 6,082,443 A | 7/2000 | Yamamoto |
| 6,170,560 B1 | 1/2001 | Daily |
| 6,175,495 B1 | 1/2001 | Batchelder |
| 6,176,964 B1 | 1/2001 | Parente |
| 6,189,286 B1 | 2/2001 | Seible |
| 6,200,664 B1 | 3/2001 | Figge |
| 6,204,200 B1 | 3/2001 | Shieh |
| 6,207,256 B1 | 3/2001 | Tashiro |
| 6,228,744 B1 | 5/2001 | Levine |
| 6,284,346 B1 | 9/2001 | Sheridan |
| 6,579,811 B2 | 6/2003 | Narwankar |
| 6,644,535 B2 | 11/2003 | Wallach |
| 6,676,797 B2 | 1/2004 | Tippett |
| 6,684,943 B2 | 2/2004 | Dobbs |
| 6,739,104 B2 | 5/2004 | Tokonabe |
| 6,740,381 B2 | 5/2004 | Day |
| 7,211,348 B2 | 5/2007 | Wadley |
| 7,288,326 B2 * | 10/2007 | Elzey et al. ................. 428/593 |

OTHER PUBLICATIONS

Unknown, "DUOCEL Foam Metal for Semiconductor Applications," ERG Materials and Aerospace Corporation website.

Unknown, ERG Materials and Aerospace Corporation website.

Unknown, "Reticulated Vitreous Carbon," ERG Materials and Aerospace Corporation website.

Unknown, "Properties of DUOCEL Silicon Carbide Foams," ERG Materials and Aerospace Corporation website.

Boomsma, "Metal Foams for Compact High Performance Heat Exchangers," Laboratory of Thermodynamics in Emerging Technologies, website 2001.

Gibson, "Metallic Foams: Structure, Properties and Applications," ICTAM 2000, (Aug. 28, 2000).

Unknown, "Directed Vapor Deposition of Ultralightweight Metal Foams," UVA website.

Unknown, "Micro Heat Exchangers," Institut for Mikrotechnik Mainz GmbH, (Feb. 1, 1998).

Naanes, "Grant funds University heat-exchanger project," The Reveille, Louisiana State University, (Nov. 9, 1999).

Unknown, "Solid Sorption Machines with Heat Pipe Heat Exchangers for Heat Transfer Enhancement and Thermal Control," U.S. Civilian Research & Development Foundation website, Abstract #BE1-107.

Itoh, "Itoh's Micro Heat Pipe Home Page," Itoh's website.

Unknown, "A High Performance Heat Sink Using Micro Heat-Pipes Now Available at Low Price," Furukawa Electric website, (Jan. 25, 2000).

Unknown, "The Application of Micro-Heat-Pipe in a Portable Electronic System," Industrial Technology Research Institute, vol. 7 (Winter), (1996).

Unknown, "Thermal Management—Heat Pipes," Fujikura Europe Limited website, United Kingdom.

Unknown, "Thermal Management—Heat Sinks," Fujikura Europe Limited website, United Kingdom.

Queheillalt, et al., "Electron beam—directed vapor deposition of multifunctional structures," Mat. Res. Soc. Symp. Proc., vol. 672, (Nov. 12, 2001).

Seok Hwan Moon, et al., "Experimental study on the thermal performance of micro-heat pipe with cross-section of polygon," Microelectronics Reliability 44 (2004) 315-321, (Feb 12, 2003).

Sypeck, "Multifunctional microtruss laminates: Textile synthesis and properties," Mat. Res. Soc. Symp. Proc. vol. 672 2001 Materials Research Society.

Evans, "Lightweight materials and structures," MRS Bulletin Oct. 2001.

L. J. Gibson, "Mechanical Behavior of Metallic Foams," Annu. Rev. Matter. Sci., p. 191-227, 2000.

Wadley, "Electron Beam —Directed Vapor Deposition of Superthermal Conducting Structures" Jun. 13-15, 2001 (this reference was previously submitted Jun. 25, 2007, but with incorrect title).

* cited by examiner

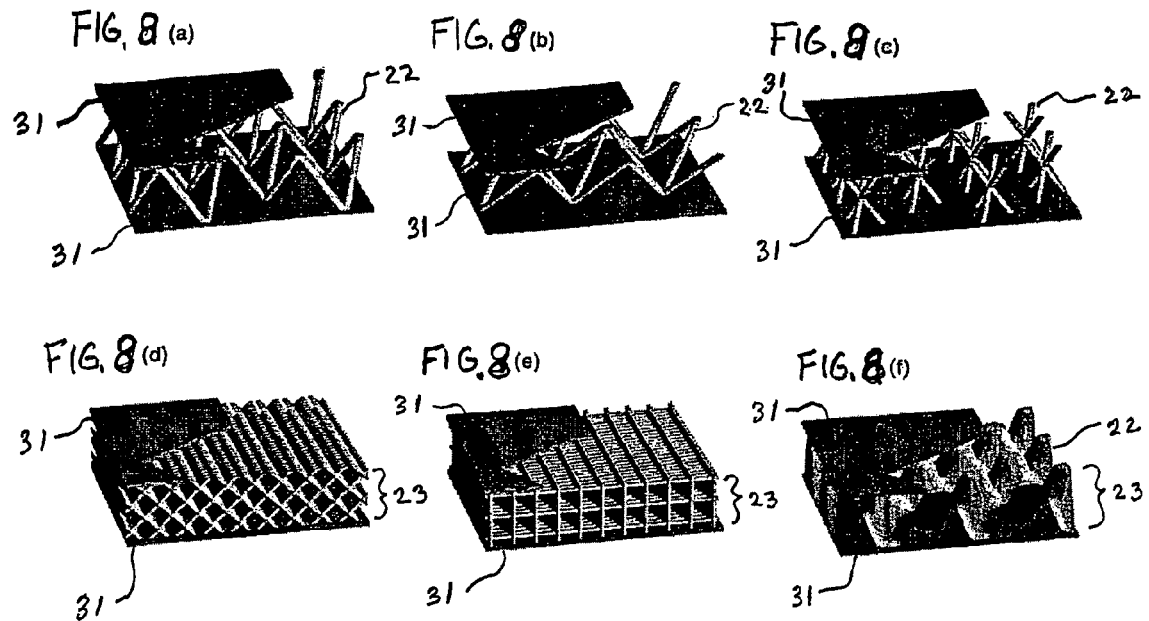
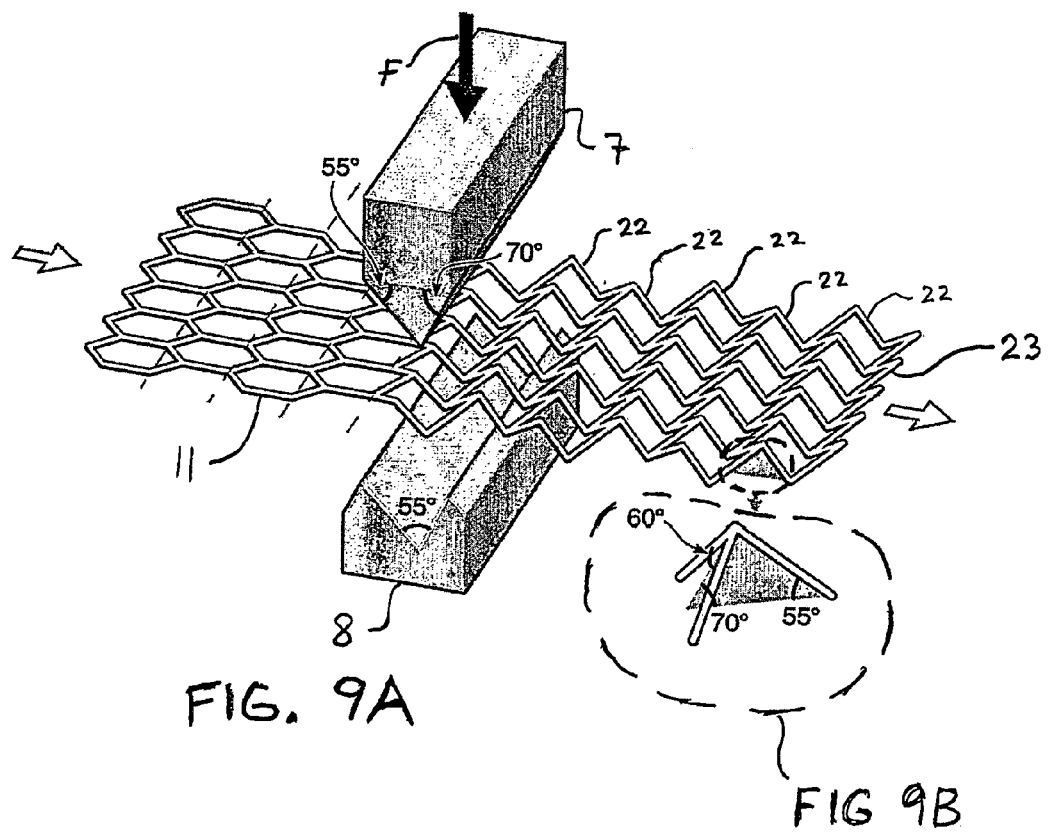

US 7,424,967 B2

METHOD FOR MANUFACTURE OF TRUSS CORE SANDWICH STRUCTURES AND RELATED STRUCTURES THEREOF

RELATED APPLICATIONS

This application is a national stage filing of International Application No. PCT/US2003/027606, filed on Sep. 3, 2003, which claims benefit under 35 U.S.C Section 119(e) from U.S. Provisional Application Ser. No. 60/407,756, filed on Sep. 3, 2002, entitled "Method For Manufacture of Titanium Truss Core Sandwich Structures and Related Structures Thereof," the entire disclosures of which are hereby incorporated by reference herein in their entirety.

US GOVERNMENT RIGHTS

This invention was made with United States Government support under Grant No. N00014-01-1-1051, awarded by the Defense Advanced Research Projects Agency/Office of Naval Research. The United States Government has certain rights in the invention.

BACKGROUND OF TH INVENTION

The present invention relates to a periodic cellular structure fabricated using three dimensional array of truss or truss-like units that can be used as a multifunctional lightweight structural core for structural panels. More particularly, the present invention relates to a method of manufacturing such a periodic cellular structure using diffusion bonding techniques resulting in either an array or series of stacked arrays of three dimensional truss units and resultant structures thereof.

There exists a need in the art for manufacturing methods for making topologically controlled cellular metals that are applicable to titanium and titanium alloys. The present invention provides, among other things, a new process that utilizes a diffusion bonding approach to create truss cores for sandwich panels and other panel types from titanium and titanium alloys and other materials for which diffusion bonding is feasible.

BRIEF SUMMARY OF INVENTION

An embodiment provides a method of constructing a cellular structure having nodes therein comprising: providing at least one truss layer comprised of at least one truss unit, at least one of the truss units being comprised of truss members; providing at least one panel in mechanical communication with the at least one truss unit of the at least one truss layer, the mechanical communication defines contact regions wherein the at least one truss unit is coupled to the at least one panel; the nodes being defined as intersections existing among any of the truss members and the nodes also being defined by the contact regions; providing at least one node pin, the at least one node pin spanning between two desired the nodes; and diffusion bonding at least one of the truss layer to the at least one panel. The bonding includes: applying heat, and applying force that results in the truss layer and the panel that are being bonded to be pressed together, the node pins provide support for the structure so as to concentrate or transmit the applied force onto the contact regions.

An embodiment provides a method of constructing a cellular structure having nodes therein comprising: providing at least one intermediate member; bending at least one of the intermediate member to form a truss layer comprised of at least one truss unit, at least one of the truss units being comprised of truss members; providing at least one panel in mechanical communication with the at least one truss unit of the at least one truss layer, the mechanical communication defines contact regions wherein the at least one truss unit is coupled to the at least one panel; the nodes being defined as intersections existing among any of the truss members and the nodes also being defined by the contact regions; providing at least one node pin, the at least one node pin spanning between two desired the nodes; and diffusion bonding at least one of the truss layer to the at least one panel. The bonding includes: applying heat, and applying force that results in the truss layer and the panel that are being bonded to be pressed together, the node pins provide support for the structure so as to concentrate or transmit the applied force onto the contact regions.

An embodiment provides method of constructing a cellular structure having nodes therein comprising: providing at least one intermediate member; providing at least one panel; providing at least two node pins, the at least two node pins located between the intermediate member and the panel; applying at least one level of force that results in: the intermediate layer to be at least one of bent, stretched, and/or otherwise deformed or combination thereof into a desired geometry in response to at least in part to the node pins to form at least one truss layer, the at least one truss layer being in mechanical communication with the panel, the mechanical communication defines contact regions wherein the at least one truss unit is coupled to the at least one panel; and diffusion bonding at least one of the truss layer to the at least one panel. The bonding includes: applying the at least one level of force that results in the truss layer and the panel that are being bonded to be pressed together, the node pins provide support for the structure so as to concentrate or transmit the applied force onto the contact regions.

An embodiment provides a cellular structure having nodes therein comprising: at least one truss layer comprised of at least one truss unit, at least one of the truss units being comprised of truss members; and at least one panel in mechanical communication with the at least one truss unit of the at least one truss layer, the mechanical communication defines contact regions wherein the at least one truss unit is coupled to the at least one panel; and the nodes being defined as intersections existing among any of the truss members and the nodes also being defined by the contact regions. The at least one of the truss layer is diffusion bonded to the at least one panel. The diffusion bonding comprises: providing at least one node pin, the at least one node pin spanning between desired the nodes, applying heat, and applying force that results in the truss layer and the panel that are being bonded to be pressed together, the node pins provide support for the structure so as to concentrate or transmit the applied force onto the contact regions.

BRIEF SUMMARY OF THE DRAWINGS

The foregoing and other objects, features and advantages of the present invention, as well as the invention itself, will be more fully understood from the following description of preferred embodiments, when read together with the accompanying drawings, in which:

FIGS. 8(A)-(F) are schematic illustrations of embodiments wherein the core comprises one truss layer between panels (or alternatively a panel and a tool) wherein the truss layers are defined by tetrahedral truss units, pyramidal truss units, kagome truss units, diamond weave layers, hollow truss layers, and egg-box layers, respectively.

FIG. 9(A) is a schematic illustration of one embodiment of the bending technique used to form a tetrahedral or tetragonal periodic cellular truss layer.

FIG. 9(B) an enlarged portion of FIG. 9(A) showing a resultant truss unit of the truss layer after bending the intermediate member.

DETAILED DESCRIPTION OF THE INVENTION

Figure 1:
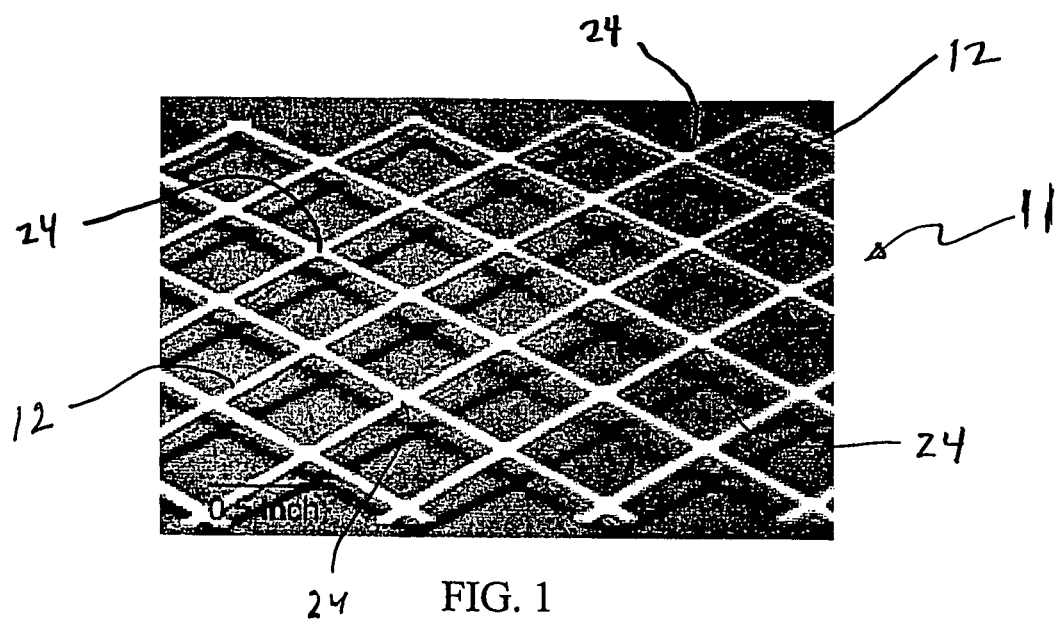
FIG. 1 provides a photographic depiction of perforated sheet before construction into a three-dimensional array of pyramidal trusses.
Figure 2:
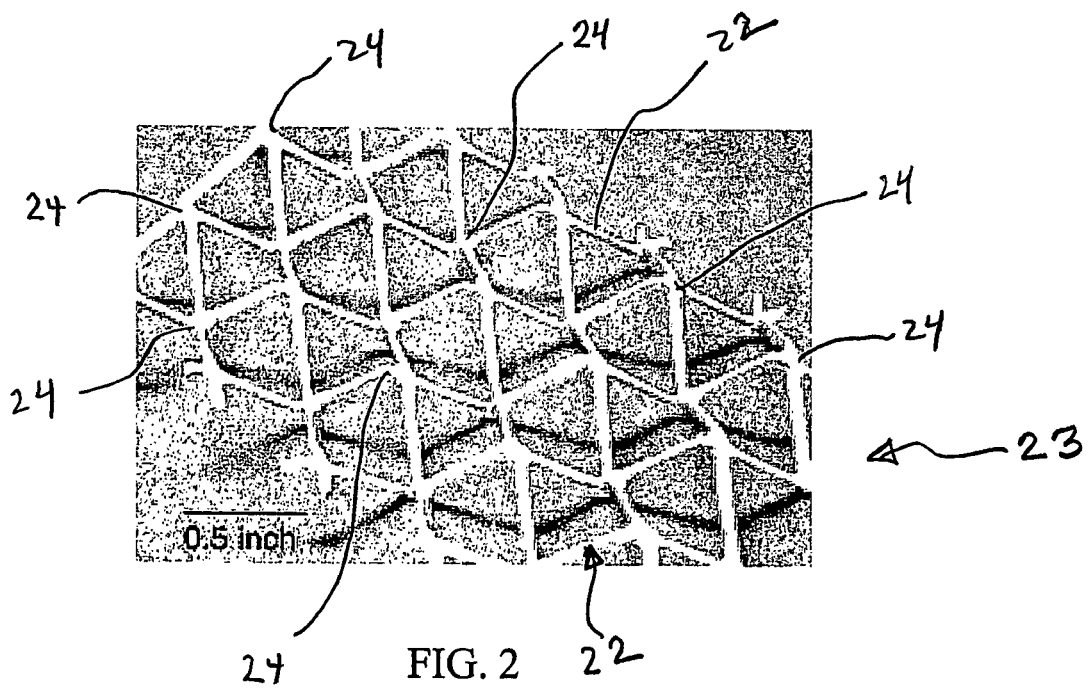
FIG. 2 provides a photographic depiction of perforated sheet after construction into a three-dimensional array of pyramidal trusses.
Figure 3A:
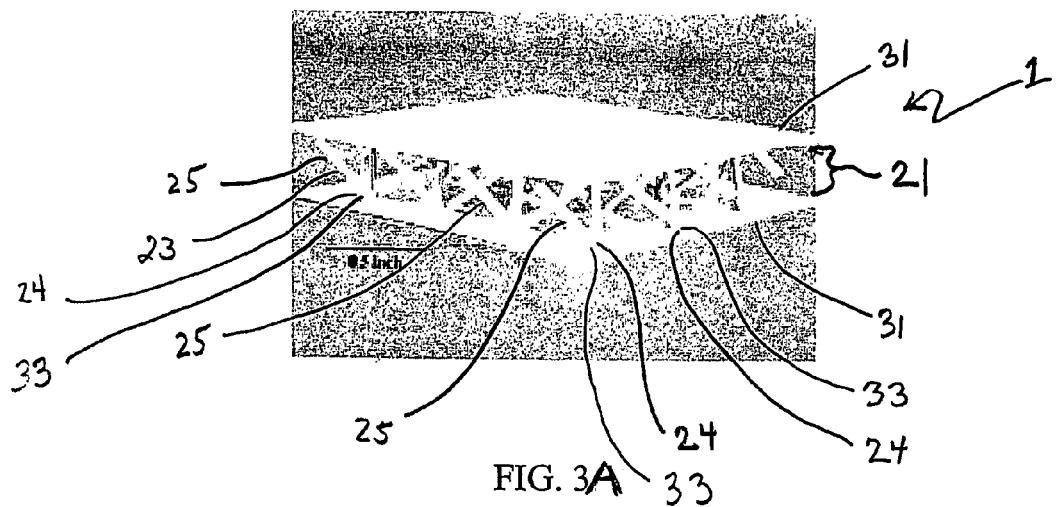
FIG. 3(A) provides a photographic depiction of square cross section trusses diffusion bonded to a panel (e.g., face sheet) in a pyramidal pattern.
Figure 3B:
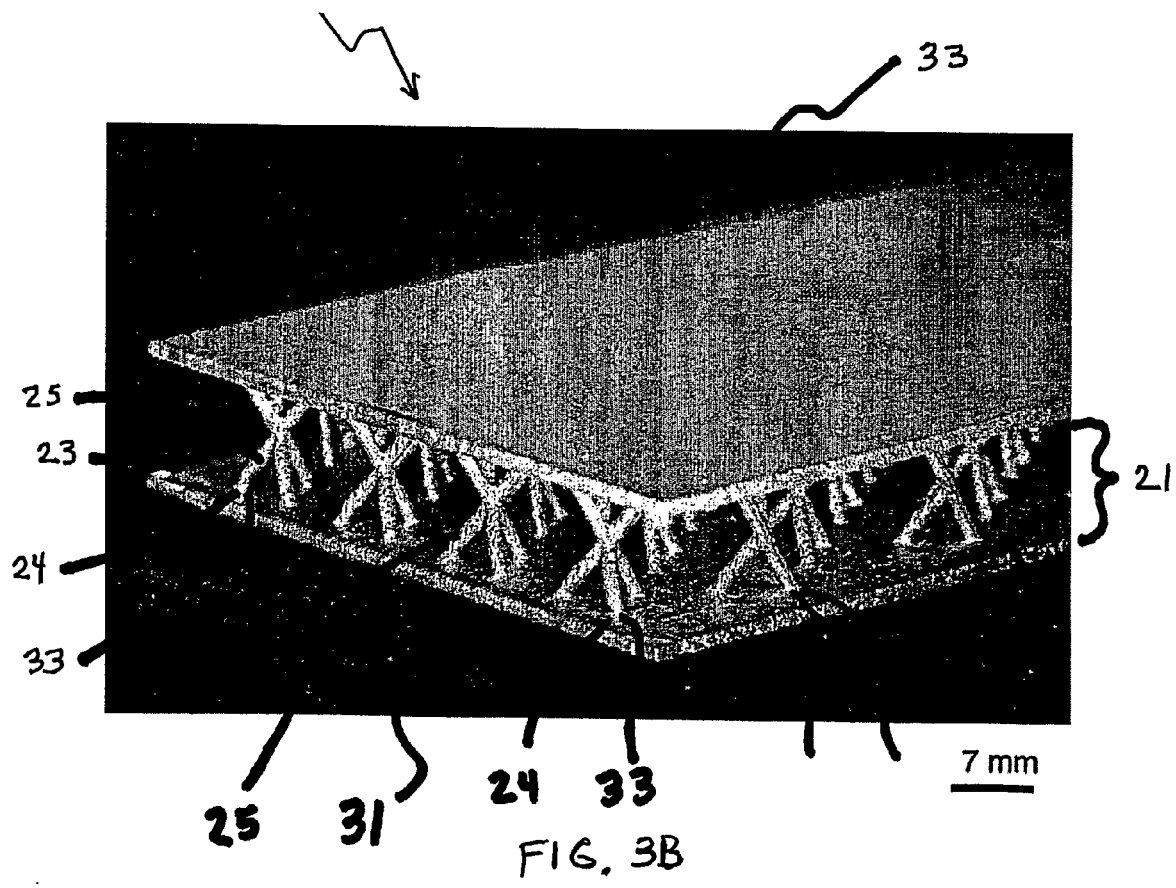
FIG. 3(B) provides a photographic depiction of one truss layer having a plurality of Kagome truss units or Kagome-like bilayer truss units bonded to a panel (e.g., face sheet).

The present invention provides a cellular structure that is fabricated in part by diffusion bonding or any other method of bonding requiring the mechanical support of a cellular structure. As an example, an embodiment includes a titanium alloy, e.g., Ti-6Al-4V, but it should be understood that all materials of titanium and titanium alloys or other materials or applications for which the diffusion bonding process is desired may be applied. Turning to FIGS. 1-3, the process may include the bending of an intermediate member 11 forming trusses of square, rectangular triangular, circular, tubular, or other cross sectional shape. The structure member 11 may be a perforated, porous, mesh, or aperture sheet. The intermediate member 11 comprises an array of intersecting structural elements. Similarly, the intermediate member 11 may comprise a multiple array of intersecting structural elements that are stacked, woven, or coupled upon one another. Moreover, for example, the pores or apertures may include circular, square, rectangular, parallelogram, hexagonal, triangular, ellipsoidal, pentagonal, octagonal, or combinations thereof or other desired shape. The structure member 11 may be an array of first intersecting structural elements stacked on a second array of intersecting structural elements as shown in PCT International Application No. PCT/US03/PCT/US03/16844, entitled "Method for Manufacture of Periodic Cellular Structure and Resulting Periodic Cellular Structure," filed on May 29, 2003 (of which is hereby incorporated by reference herein in its entirety). The first and second intersecting structural elements may be an array of wires, ligaments, or tubes (of which may be solid or hollow). The structure member 11 or fabricated core 21 may be an array of braided or intersecting textile structural elements as shown for example PCT International Application No. PCT/US01/17363, entitled "Multifunctional Periodic Cellular Solids And The Method Of Making Thereof," filed on May 29, 2001, and corresponding U.S. application Ser. No. 10/296,728, filed Nov. 25, 2002 (of which are hereby incorporated by reference herein in their entirety).

Moreover, the structure member 11 or fabricated core 21 may be a truss or truss-like unit as shown for example in PCT International Application No. Application No. PCT/US02/17942, entitled "Multifunctional Periodic Cellular Solids and the Method of Making thereof," filed on Jun. 6, 2002 (of which is hereby incorporated by reference herein in its entirety); or in PCT International Application No. PCT/US03/PCT/US03/23043, entitled "Method For Manufacture of Cellular Materials and Structures for Blast and Impact Mitigation and Resulting Structure," filed on Jul. 23, 2003. (of which is hereby incorporated by reference herein in its entirety).

As shown in FIG. 1, porous or aperture intermediate member 11 (or alternatively array of intersecting wires or tubes) provides apertures 12. In an embodiment the open area was about 87%, but it should be appreciated that various ranges of desired open areas may be implemented. The bending or other deformation of the intermediate member 11 results in array of truss units of pyramidal, tetrahedral, or other arrangement so as to provide a core. As shown in FIG. 2, the intermediate member 11 is bent to provide a plurality of three-dimensional truss units 22 that form a three-dimensional truss layer 23. In an embodiment the core density relative to that of the solid material was about 1.7%, but it should be appreciated that various ranges of desired core densities relative to the solid may be implemented. The intersections of these individual truss units shall be called nodes 24.

As will be discussed later, and generally shown in FIGS. 2-5, for example, when the three-dimensional truss layer 23 is assembled, some of these nodes 24 may come into mechanical communication with nodes from an adjacent truss layer, the outside tooling administering the applied force F on a face panel. These are known as contact regions 33. Contact regions are also defined wherein on truss unit layer is coupled to or mechanical communication with another truss unit layer. It should be appreciated that if the intermediate member 11 is deformed so that the desired contact regions 33 is not at an intersection of truss members 22, then that contact point shall be considered a node for the purposes of this work. Nodes are therefore defined by the areas formed by the truss units coupled to the panels or the legs or ligaments of the truss units intersecting with other legs or ligaments of the same truss unit or other truss units. It should also be appreciated that mechanical communication at contact regions 33 does not necessarily mean direct contact, but may permit, for example, bond-aiding interlayers or other interlayers as desired. A diffusion bonding method is used in which titanium alloy facesheets or panels 31 are placed on the top and bottom of the core structure 21 (as defined as a layer(s) of three-dimensional truss layer 23 or the like as well as other components added thereto if desired). Node pins 41 are supports for the core structure 21 to prevent undesired deformation of the core structure 21 while under loading from force F and the temperature of the assembly 1. As well as supporting the core structure 21, the node pins serve to concentrate or transmit the applied force F onto the nodes 24. In this manner, node pins 24 may be used to support the core from unwanted deformation, or to concentrate or transmit the applied force F, or both. It should be appreciated that in some cases, node pins may transmit or concentrate all or a portion of the applied force F to the nodes 24 by a form of mechanical communication other than direct contact. This mechanical communication may include a series of node pins that together transmit the desired force or portion of the force to the node 41 or contact region 33 to be bonded. It should also be appreciated that node pins may be used when simple support is desired, but it is not necessary to concentrate the applied force F. For any of these purposes, the geometry, arrangement, and shape of the node pins may be manipulated as desired. If the node pins are assembled and designed so as to concentrate or transmit all or a portion of the applied force F to the contact regions 33, then the contact regions 33 shall be subjected to a node pressure N, which is defined as the applied force F or the desired portion of applied force F that is transmitted to the contact points 33 divided by the sum of the area of contact regions 33. The assembly is placed in a vacuum furnace (or other types of furnaces) and heated to various ranges, including about 200° C. to about 2000° C., about 2000° C. to about 3730° C., 400° C. to about 1500° C., about 650° C. to about 950° C., or about 100° C. to about 300° C. with a node pressure applied having various ranges, including ranges of about 0.01 MPa to about 1000 MPa, about 0.01 MPa to about 500 MPa, about 1 MPa to about 100 MPa, or about 0.1 MPa to about 100 MPa. It should be appreciated that the force F can be applied from the top or bottom as shown and/or from the sides (not shown) if side panels are desirable. It should also be appreciated that applied force F may be varied throughout the process if desired.

It should be appreciated that the level of heat (or temperature being subjected upon the components), node pressure and air/gas/ambient pressure (e.g., vacuum, controlled atmosphere, or uncontrolled atmosphere applied shall be determined according to a number of variables including, but not limited thereto, temperature and other environmental requirements for the desired process, structure, and materials and component type (e.g., panels, truss units, truss layer, core or other necessary components).

Figure 4A:
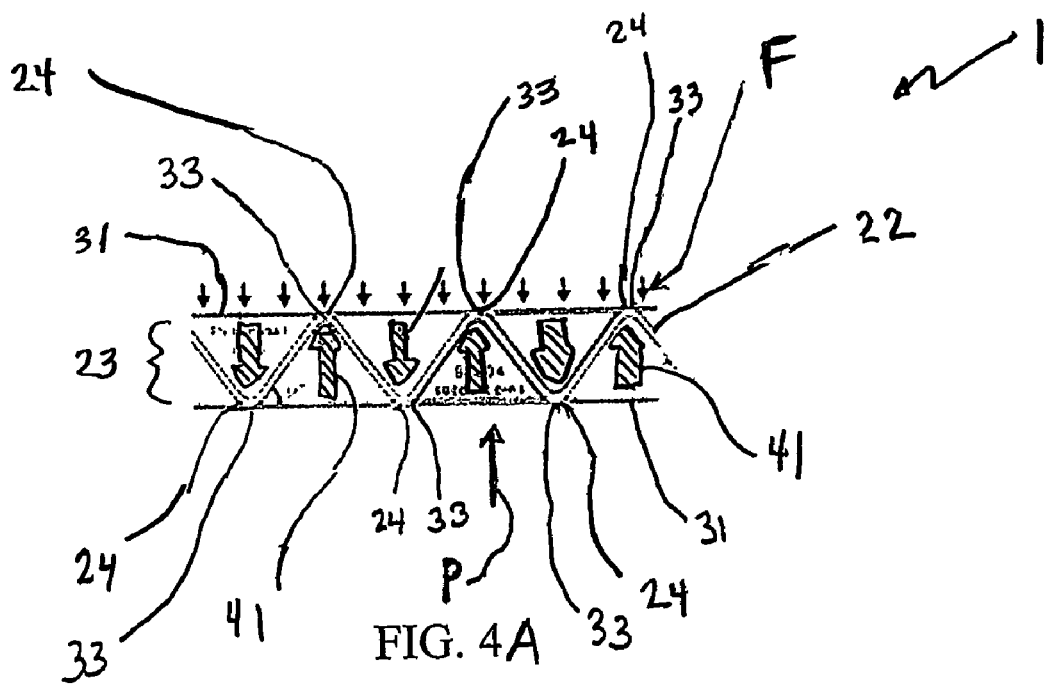
FIG. 4(A) is a schematic illustration of an embodiment of the diffusion bonding process.
Figure 4B:
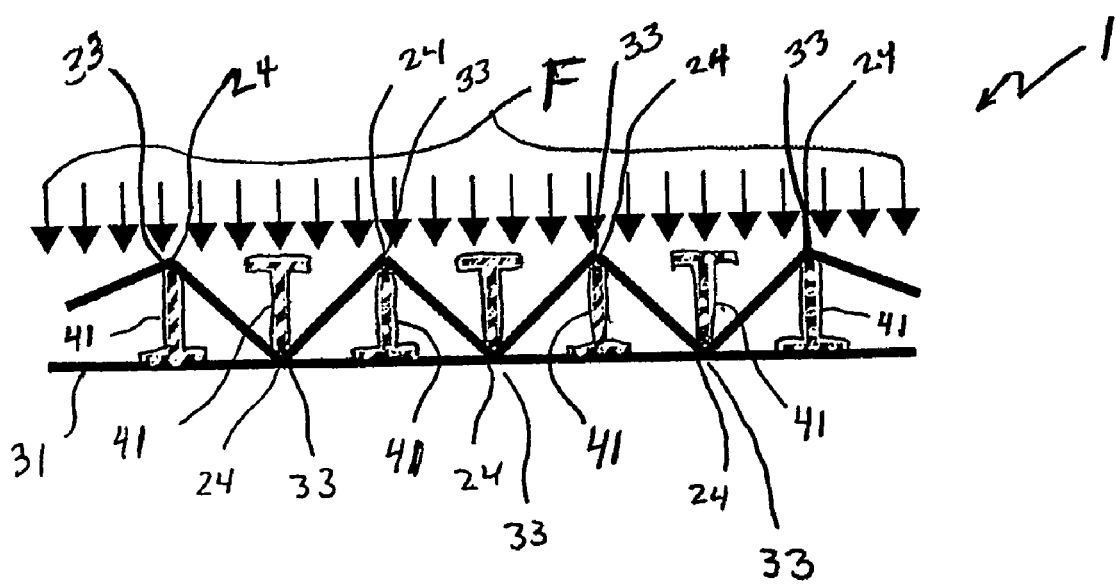
FIG. 4(B) is a schematic illustration of an embodiment of the diffusion bonding process.

Turning to FIG. 4(B) for example, it should be appreciated that multiple face panels are not required for this design. The applied force F may be applied to a structure with a truss core layer as the outermost layer of two or more bonded layers of face panels or truss layers, and the mechanical communication between the node pins 41 and the tooling applying the force F sufficient to bond the layers of the structure 1.

It should be appreciated that the face panels need not be a solid sheet. Face panels may be perforated, porous, mesh, or aperture sheet, as well as an array of first intersecting structural elements stacked on a second array of intersecting structural elements as shown in PCT International Application No. PCT/US03/PCT/US03/16844, entitled "Method for Manufacture of Periodic Cellular Structure and Resulting Periodic Cellular Structure," filed on May 29, 2003 (of which is hereby incorporated by reference herein in its entirety). It should also be appreciated that the intermediate panels used between core assemblies may be of any of these structures as well.

The truss units comprise of a plurality of legs or ligaments 25. The legs may have a variety of shapes such as straight or curved and may have a variety of cross-sections. Examples of the resulting truss core sandwich structures 1 are shown in photographic depictions of FIGS. 3(A)-(B).

In addition to the high mechanical performance of truss core sandwich structures 1 and/or the cores 21, they lend themselves to multifunctional concepts. Such multifunctional concepts include heat transfer according to the design criteria and function as shown in PCT International Application No. PCT/US01/22266, entitled "Heat Exchange Foam," filed on Jul. 16, 2001, and corresponding U.S. application Ser. No. 10/333,004, filed Jan. 14, 2003 (of which are hereby incorporated by reference herein in their entirety).

Another multifunctional concept includes battery or power storage cores, for example, according to the design criteria and concept as shown in PCT International Application No. PCT/US01/25158, entitled "Multifunctional Battery and Method of Making the Same," filed on Aug. 10, 2001, and corresponding U.S. application Ser. No. 10/110,368, filed Jul. 22, 2002 (of which are hereby incorporated by reference herein in their entirety).

There are numerous other functionalities, which can be added into or with these structures 1 (or with these arrays of cellular housings) making them ideal candidates for "structure plus" multifunctional materials. For example the present invention general structural material may be involved in architecture (for example: pillars, walls, shielding, foundations or floors for tall buildings or pillars, wall shielding floors, for regular buildings and houses), the civil engineering field (for example; road facilities such as noise resistant walls and crash barriers, road paving materials, permanent and portable aircraft landing runways, pipes, segment materials for tunnels, segment materials for underwater tunnels, tube structural materials, main beams of bridges, bridge floors, girders, cross beams of bridges, girder walls, piers, bridge substructures, towers, dikes and dams, guide ways, railroads, ocean structures such as breakwaters and wharf protection for harbor facilities, floating piers/oil excavation or production platforms, airport structures such as runways) and the machine structure field (frame structures for carrying system, carrying pallets, frame structure for robots, etc.), the automobile (the body, frame, doors, chassis, roof and floor, side beams, bumpers, etc.), the ship (main frame of the ship, body, deck, partition wall, wall, etc.), freight car (body, frame, floor, wall, etc.), aircraft (wing, main frame, body, floor, etc.), spacecraft (body, frame, floor, wall, etc.), the space station (the main body, floor, wall, etc.), the submarine (the body, frame, etc.), and is related to the structural material which requires extreme dynamic strength.

Varying the cross section of the trusses units 22, their arrangement, the thickness of the face sheets 11, and the thickness of the core 21 enables control of the strength of the truss core sandwich structures 1 and/or the cores 21. Various embodiments use trusses of square cross section constructed by the bending of perforated or aperture sheet or array of intersecting truss members. By using triangular, circular, hexagonal, rectangular, tubular, (four-sided or any number of sides) etc. cross section structures, the macroscopic stiffness of the structure can be varied because the shape factors of the different cross section shapes behave very differently mechanically. Structure members 11 of a perforated pattern may be used as well to further vary properties of the truss core sandwich structures 1. Because the truss core sandwich structures 1 (or truss layer(s) with other panel(s) or sheet(s)) contain considerable surface area and empty volume, additional functionality can be readily integrated into the structures.

Accordingly, the present invention provides, but not limited thereto, embodiments whereby the creation of a titanium, titanium alloy, cellular metal, ceramic, polymer, metal, metal alloy, semiconductor or composite systems (i.e., at least one of the truss units, truss layer, and/or panels) are fabricated by diffusion bonding or other type of bonding.

Moreover, fabrication by using diffusion bonding or other type of bonding of at least one of the truss units, truss layer, and/or panels comprise of a material of at least one of, but not limited thereto: Ti-6Al-4V, TiAl, TiAlV, Ti, CP (Commercially pure) Ti, Ti-3Al-2.5V, Ti-5Al-2.5 Sn, Ti-6211, Ti-6242, Ti-8Al-1Mo-1V, Ti-11, TIMETAL 1100, IMI 230, IMI 417, IMI 679, IMI 685, IMI 829, IMI 834, Ti-5Al-6 Sn-2 Zr-1Mo-0.1 Si, Ti-17, Ti-6246, Ti-6Al-6V-2 Sn, Ti-7Al-4Mo, TIMETAL 62 S, SP-700, IM 367, IMI 550, IMI 551, Corona 5, Ti-6-22-22-S, Ti-4Al-3Mo-1V, Ti-5Al-1.5Fe-1.4Cr-1.2Mo, Ti-5Al-2.5Fe, Ti-5Al-5 Sn-2 Zr-2Mo-0.25 Si, Ti-6.4Al-1.2Fe, Ti-2Fe-2Cr-2Mo, Ti-8Mn, Beta III, Beta C, Ti-10-2-3, Ti-13V-11Cr-3Al, Ti-15-3, TIMETAL 21 S, Beta CEZ, Ti-8Mo-8V-2Fe-3Al, Ti-15Mo-5 Zr, Ti-15Mo-5 Zr-3Al, Transage 129, Transage 134, Transage 175, Ti-8V-5Fe-1Al, Ti-16V-2.5Al, Ti-aluminides, Ti3Al alloys, Gamma TiAl alloys, and/or TiNi smart metal alloys (SMA's).

Many core topologies can be created in this way. For example, titanium alloy (or other diffusion bondable materials) can be made as a wire, ligament, leg, or tube.

Alternatively, rather than bending the structure members, it is possible that the truss layer or truss core is completely or partially prefabricated. An embodiment would require diffusion bonding various layers of the truss core together as well as diffusion bonding the truss core to the panels. Various methods of prefabrication are possible. Various examples of prefabricated cores are discussed in PCT International Application No. Application No. PCT/US02/17942, entitled "Multifunctional Periodic Cellular Solids and the Method of Making thereof," filed on Jun. 6, 2002 (of which is hereby incorporated by reference herein in its entirety), including the construction of cellular solids, which involves selective bonding of a solid or porous sheet within solid or porous sheets followed by internal expansion. This could occur within the confines of a tool to produce near net shape parts, the sheets have spot bonds prior to expansion.

Other methods are discussed in PCT International Application No. PCT/US03/PCT/US03/16844 (as cited above and is hereby incorporated by reference herein in its entirety) providing illustrations of embodiments of the bending techniques used to form the stacked pyramidal periodic cellular structure.

FIG. 9 depicts one method of completing the bending step in order to achieve a desired truss layer 23. A wedge-shaped punch 7 is applied in a direction perpendicular to the planes of intermediate member 11 of that is a perorated sheet comprised of elongated hexagonal perforations/apertures. As shown in FIG. 9, the wedge-shaped punch 7 used to bend the intermediate member 11 into an interlocking die 8 such that the desired bending angles are achieved in the resulting truss layer 23 comprised of tetragonal truss units 22. It should be appreciated that the wedge 8 and punch 7 may have a variety of bending angles and sizes so as to achieve the truss units with appropriate angles and shapes. FIG. 9(B) is an enlarged portion of FIG. 9(A) showing a resultant truss unit 22 of the truss layer 23 after bending the intermediate member 11. Alternatively, a press, stamp, or rolling process (e.g., passage through a set of saw-toothed rollers or gears) may be used.

The examples shown in FIGS. 2-4 show the trusses arranged in a pyramidal pattern, and the aperture pattern necessary for the pyramidal arrangement. The pyramidal pattern and perforation pattern as shown are for illustrative purposes only and therefore can be a wide variety of shapes and sizes. For pyramidal cores, square, rectangular, parallelogram, or diamond perforations are effective. For tetrahedral, Kagome or Kagome-like cores, triangular or hexagonal holes are suitable. For example, turning to FIGS. 8(A)-(F), FIGS. 8(A)-(F) show schematic illustrations of embodiments wherein the core 21 comprises at least one truss layer 23 between panels 31 (or alternatively may be a singular panel or a tool) wherein the truss layers are defined by truss units 22 that are tetrahedral truss units, pyramidal truss units, kagome truss units, diamond weave layers, hollow truss layers, and egg-box layers, respectively. It should be further appreciated that the truss units as discussed throughout this document may be comprised of: legs or ligaments; closed cell analogs (solid or semi-solid faces); or any combination thereof.

In an embodiment, the diffusion bonding is achieved by applying a force on the sheets 11 (or alternatively the core 21) that results in a pressure of about 0.1 to about 100 MPa on the contacts areas 33 between the panel 31 and the truss units 22 (or alternatively on the nodes 24 between different truss layers 23). The nodes 24 provide a contact area or region 33 for the applied force to produce a node pressure. The assembly is placed into a vacuum furnace (or other type of furnace) and heated (if necessary) to about 650-950° C. As best shown in FIG. 4, node pins 41 are used to support the truss units 22 and/or truss layers 23 during the diffusion bonding process and to concentrate the applied force onto the panel 31 contact areas 33. In an embodiment, the node pins 41 provide support for the core geometry and are aligned parallel or at least substantially parallel to the force being applied. The node pins 41 concentrate or transmit the applied force onto desired contact regions 33 on the panel 31 and/or between truss layers 23 or nodes 24. These node pins 41 may be removed after the bonding process is complete or at a time when appropriate. Of course, the node pins may remain on a longer term basis if so desired, for whatever period of time may be desired.

This sandwich structure 1 and/or core 21 can be readily varied such that the trusses layer(s) 23 may be used in any configuration. The overall morphology, cell size, relative density, and mechanical behavior of these structures can be varied by the dimensions of the trusses, the core thickness, the face sheet thickness, and the arrangement of the trusses.

It should be appreciated that the panels 31 and/or cores 21 as discussed throughout can be planar, substantially planar, and/or curved shape, with various contours as desired. The panels can be solid sheets, perforated or aperture sheet, mesh, or any other 2-D or 3-D panel.

It should further be appreciated that the truss units 22 as specifically illustrated are designed to support axial loads, but are not limited thereto. For instance, the truss units may also be designed so as to support bending moments as well.

Moreover, it should be appreciated that pyramid includes any four legged or four sided truss unit (excluding bottom face) at various angles or side lengths. Similarly, tetragonal includes any three legged or three sided truss unit (excluding bottom face) at various angles or side lengths. It should be appreciated that arrays of trusses with any number of resultant leg arrangements may be produced and that production is not limited to 3-legged or 4-legged structures.

Figure 5A:
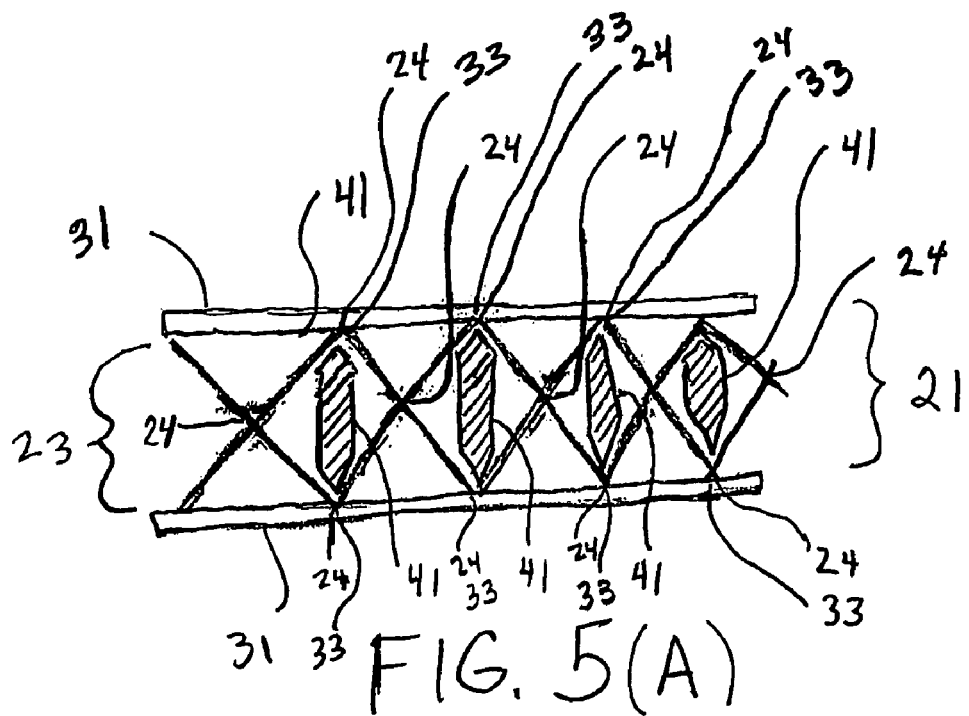
FIGS. 5(A)-(B) are schematic illustrations of an embodiment wherein the core comprises one truss layer having a plurality of Kagome or Kagome-like bilayer truss units or alternatively two layers of unit truss layers having a plurality of truss units, respectively. At least one or two panels are provided on opposite sides of the core.
Figure 5B:
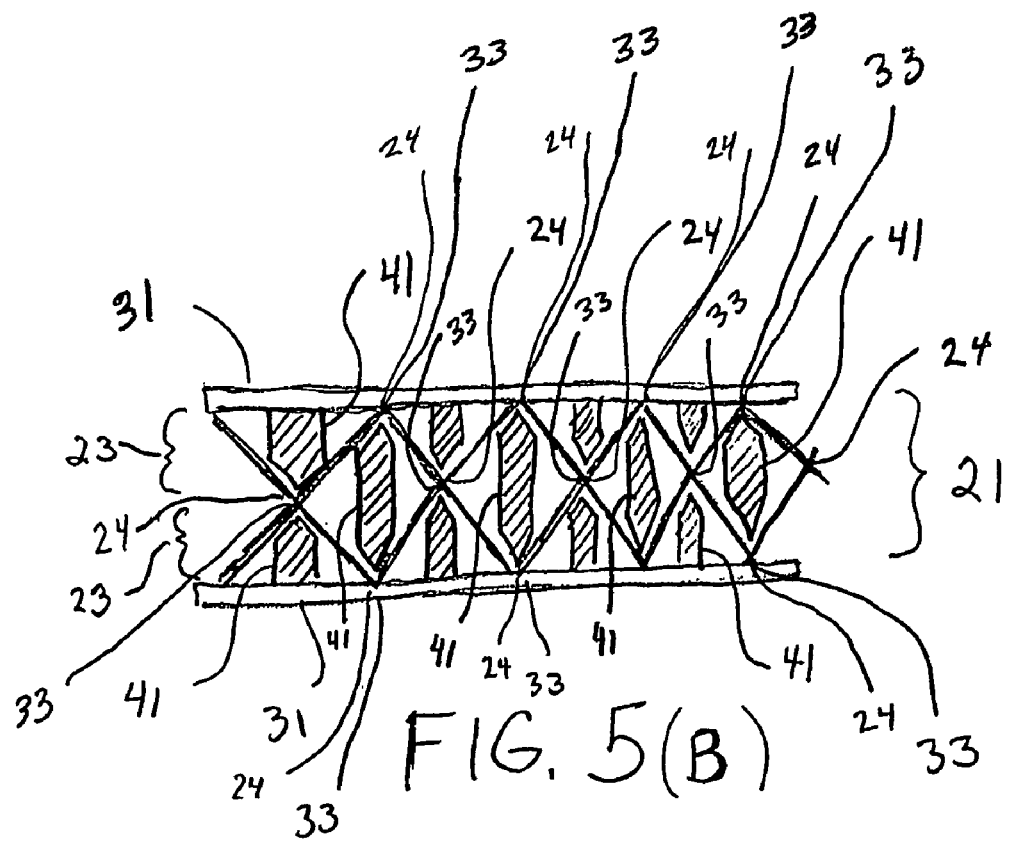

FIGS. 5(A)-(B) are schematic illustrations of an embodiment wherein the core 21 comprising two layers of unit truss layers 23 having a plurality of truss units 22 or alternatively one truss layer 23 having a plurality of Kagome truss units, Kagome-like truss, or bilayer units, respectively. While Kagome architecture is a certain arrangement, it should be appreciated that Kagome includes Kagome structures as well as Kagome-like structures. For instance, the truss may be any bilayer or trilayer or higher, according to desired geometry. Turning to FIG. 5(A), for Kagome, Kagome-like truss units, or as desired geometry truss units, the node pins 41 generally span from node 24 to node 24 thereby extending from a panel 31 (i.e., at contact region 33 at or communication with panel) to other panel 31 (i.e., at contact region 33 at or communication with panel) since the only bonding is at the contact regions 33 (as a result of the bilayer architecture as shown). Turning to FIG. 5(B), for an embodiment wherein the core 21 comprise two or more layers of unit truss layers 23 the node pins 41 generally span from node 24 to node 24 thereby extend from a panel 31 (i.e., at contact region 33 at or communication with panel) to other panel 31 (i.e., at contact region 33 at or communication with panel) as well as from node 41 to node 41 wherein the truss layers 23 are coupled to one another at the contact region 33 as a result of the truss unit layer on top being in contact with or communication with a lower truss unit layer as shown, for example. The use of these node pin arrangements are shown for two-layer cores, but are not limited thereto. The arrangement of node pins may be extended to any desired number of layers of truss layers or face panels. The node pins keep the stress off the trusses, unless some deformation of the truss members is desired. The core may settle or deform slightly during bonding, but the node pins assure that the desired geometry is achieved. It should be appreciated that any number of truss layers and panels may be stacked upon one another. Further, the node pins may not necessarily be used in all areas throughout the structure, but rather as required or desired.

Figure 5C:
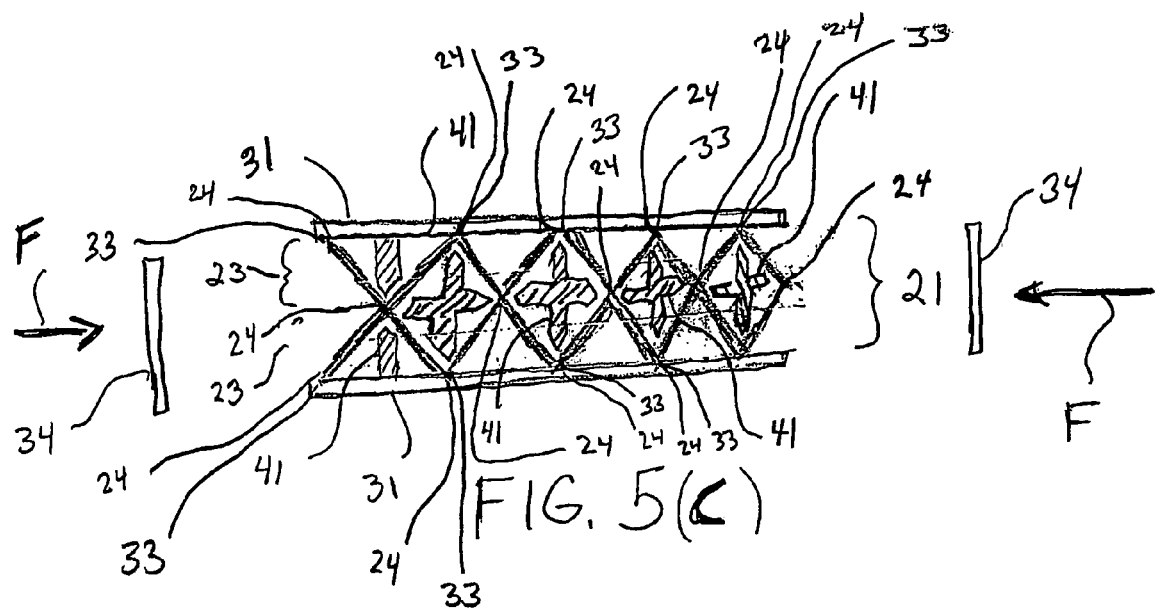
FIG. 5(C) is a schematic illustration of an embodiment as similarly shown in FIGS. 5(A)-(B), wherein side panels are provided for bonding to the core.

FIG. 5(C) is a schematic illustration of an embodiment wherein the core 21 comprising two layers of unit truss layers 23 having a plurality of truss units 22 or alternatively one truss layer 23 having a plurality of Kagome truss units, Kagome-like truss, or bilayer units. It should be appreciated that the node pins 41 may also extend horizonatally in response to side panels 34 being pressed onto the core 21 in response to force F. It should be appreciated that the panels can have a variety of shapes and sizes and applied to the core from a variety of directions (e.g., diagonally or as needed) other than directions specifically illustrated. The node pins keep the stress off the trusses, unless some deformation of the truss members is desired. The core may settle or deform slightly during bonding, but the node pins assure that the desired geometry is achieved. It should be appreciated that any number of truss layers and panels may be stacked upon one another. Further, the node pins may not necessarily be used in all areas throughout the structure, but rather as required or desired.

Figure 6:
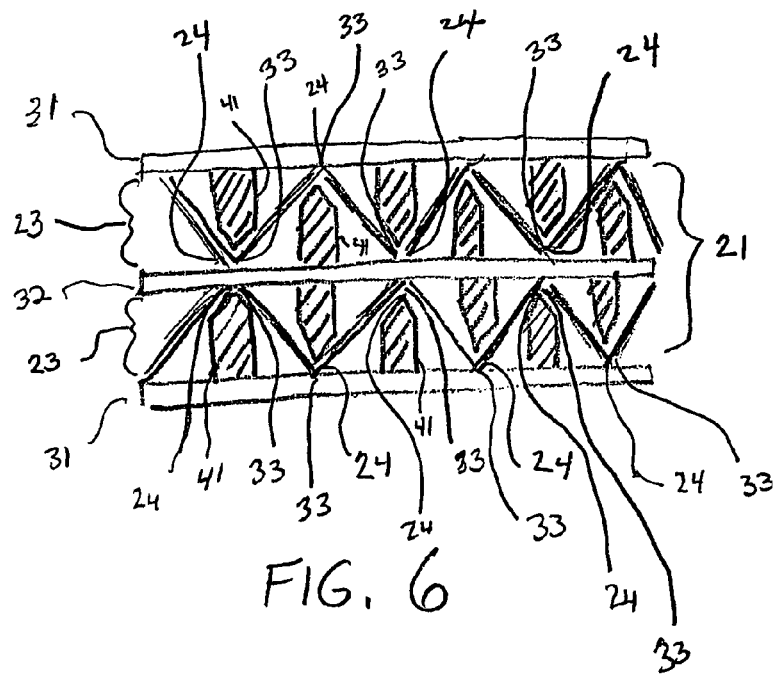
FIG. 6 is a schematic illustration of an embodiment wherein the core comprises one truss layer on either side of a panel there between. At least one or two panels provided on opposite sides of the core.

FIG. 6 is schematic illustration of an embodiment wherein the core 21 comprises one truss layer 23 on either side of an interior panel 32 there between. The node pins generally span from node 24 to node 24 thereby extending from the interior panel at the contact region 33 to the exterior panel at the contact regions 33. The node pins keep the stress off the trusses, unless some deformation of the truss members is desired. The core may settle or deform slightly during bonding, but the node pins assure that the desired geometry is achieved. It should be appreciated that any number of truss layers, interior panels, and exterior panels may be stacked upon one another, as well as in between one another. Further, the node pins may not necessarily be used in all areas throughout the structure, but rather as required or desired.

Figure 10:
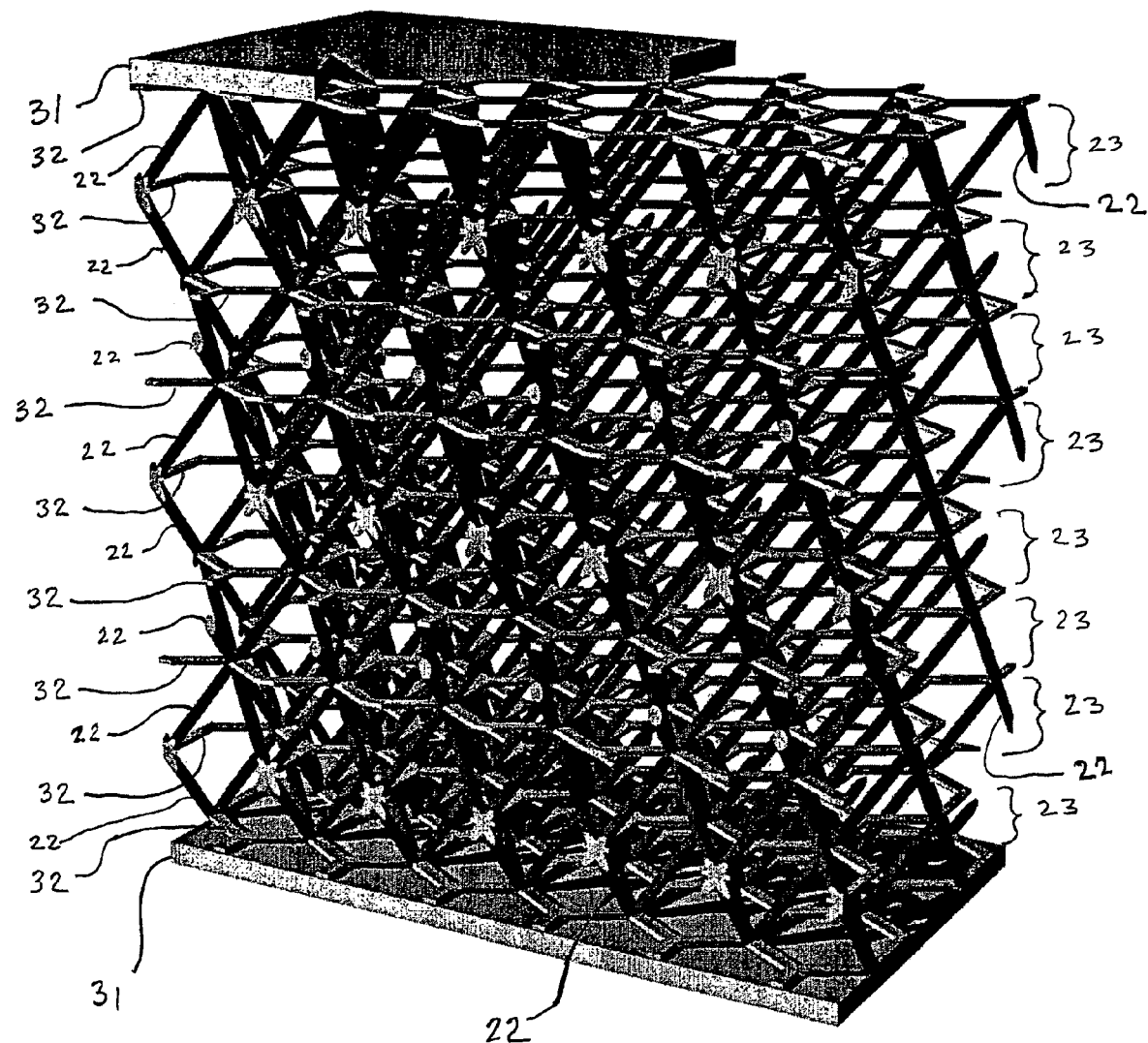
FIG. 10 is schematic illustration of an embodiment wherein the core comprises a plurality of truss layers alternating with a plurality of interior panels (or tooling members) there between, all of which is sandwiched between two panels (or tooling members).

FIG. 10 is schematic illustration of an embodiment wherein the core 21 comprises a plurality of truss layers 23 alternating with a plurality of interior panels 32 there between, all of which are sandwich between two panels (e.g., face sheets) 31. The truss layers 23 are comprised of tetragonal truss units 22 and the internal panels are perforated/aperture hexagonal sheets. It should be appreciated that one or more of the exterior panels 31 and/or interior panels 32 may be tooling members.

The truss units and truss layers may deform under heat and applied force but the node pins are there to assure a desired geometry. Therefore, the cellular structure could be laid up with the core incompletely deformed and the nodal pins finish the job of forming the core under applied force as well as supporting the core during bonding.

Figure 7A:
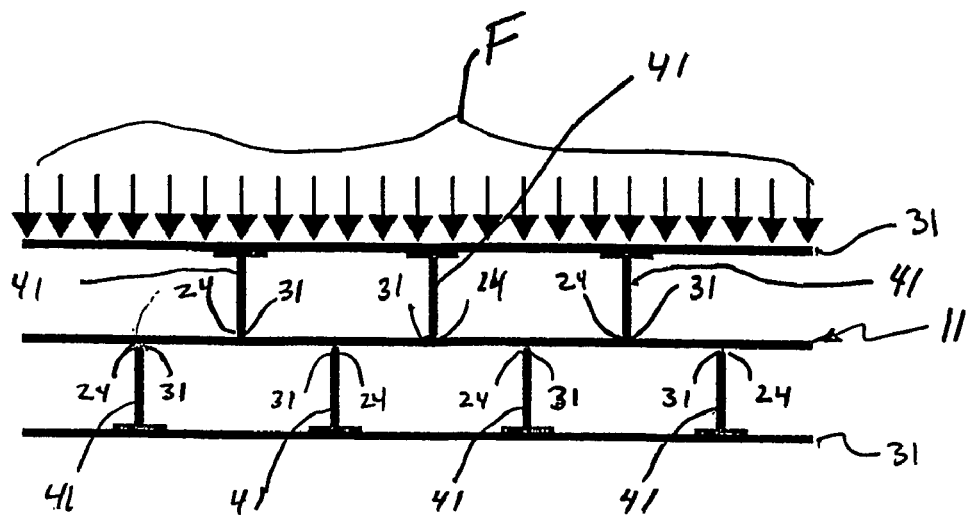
FIGS. 7(A)-(C) are schematic illustrations of an embodiment wherein the core is unformed or incompletely formed at the outset of the procedure and is formed by the applied force transmitted by node pins into a 3-dimensional array of truss units, after which the transmitted force causes bonding of the truss units to the panel.
Figure 7B:
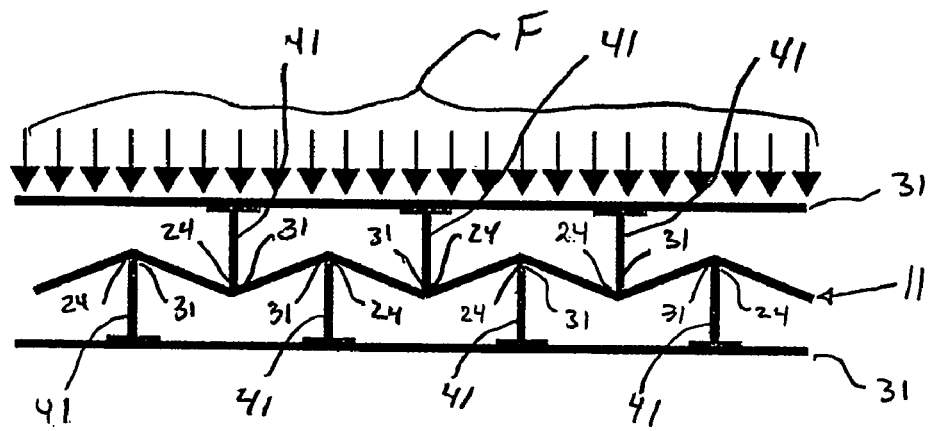
Figure 7C:
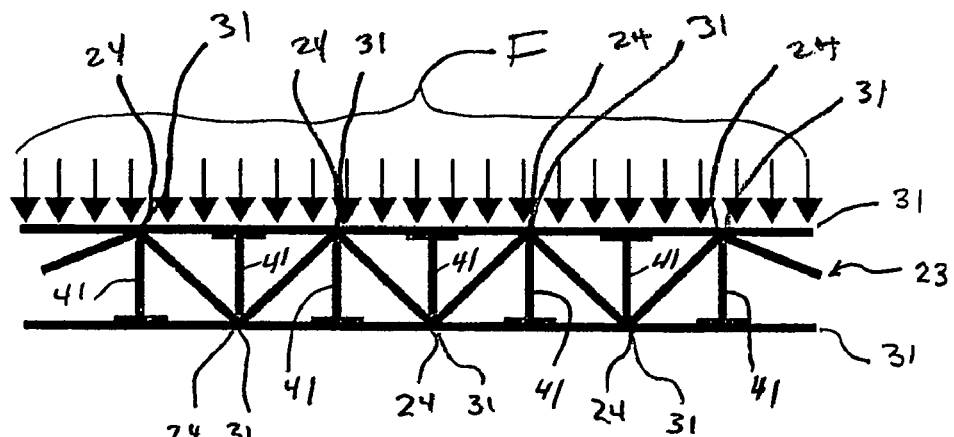

FIGS. 7(A)-(C) are schematic illustrations of an embodiment wherein the core 21 is unformed or incompletely formed before application of applied force F. As shown in FIG. 7(A), the node pins 41 are placed so as to be in mechanical communication with the upper face panel 31 or the tooling exerting force F upon the assembly. As shown in FIG. 7(C), the node pins 41 are placed so as to bend, stretch, or otherwise deform the unformed or incompletely formed core into a final geometry, and then under continued application of force F, bond the core truss layer 23 at contact areas 33. FIG. 7(B) represents the core in a partially formed position. It should be appreciated that F is not a fixed value during the forming and bonding steps and can be varied at different steps of the process as desired. Moreover, it should also be appreciated that the core truss layer 23 may be of any geometry or arrangement. It should be appreciated that any number of truss layers, interior panels, and exterior panels may be stacked upon one another, as well as in between one another, as in the geometries and arrangements of any and all multilayer assemblies shown above. Further, the node pins may not necessarily be used in all areas throughout the structure, but rather as required or desired. Further, the node pins may be replaced or changed at various occasions during the process so as to further modify geometry or other procedural variables as required or desired.

The node pins 41 may be a variety of shapes. As shown in the drawings throughout this document, the node pins may be wider in a left to right direction and may be a variety of lengths extending through the plane of the paper as drawn. It should be appreciated that node pins may be of any geometry desired in order to concentrate or transmit the applied force to the contact regions or to deform the material, or both functions.

Intermediate 11 members of a perforated or textile pattern may be used as well. There are a wide variety of processing variables that may be varied to produce structures with unique properties.

At least some of the embodiments of the present invention provide, among other things, a diffusion bonding process that enables the manufacture of periodic cellular cores with truss or metal textile core topologies. It requires no use of transient liquid phases, but other bonding methods than diffusion bonding, including those using transient liquid phases or other metallurgical bonding techniques, as well as including adhesive techniques, may be used while using node pins for support. The processes of some of the various embodiments of the present invention process allows the strength of the structure to be high because the nodes formed by the contacts of the structure are of the same strength as the metal from which they are formed, as well as avoiding corrosive effects from a base metal in contact with a dissimilar filler metal. In addition, these materials lend themselves to multifunctional integration for heat transfer, power storage, energy absorption, and etc. applications. Also, this manufacturing technique of the various embodiments should be economically viable when compared with other periodic cellular metals manufacturing technologies.

The following publications, patents, patent applications are hereby incorporated by reference herein in their entirety:
1. U.S. Pat. No. 3,533,153 to Melill et al.
2. U.S. Pat. No. 3,633,267 to Deminet et al.
3. U.S. Pat. No. 3,981,429 to Parker
4. U.S. Pat. No. 4,043,498 to Conn, Jr.
5. U.S. Pat. No. 4,522,859 to Blair
6. U.S. Pat. No. 4,869,421 to Norris et al.
7. U.S. Pat. No. 4,893,743 to Eylon et al.
8. U.S. Pat. No. 5,024,369 to Froes et al.
9. European Patent No. EP 1 238 741 A1 to Leholm Of course it should be understood that a wide range of changes and modifications could be made to the preferred and alternate embodiments described above. It is therefore intended that the foregoing detailed description be understood that it is the following claims, including all equivalents, which are intended to define the scope of this invention.

We claim:

1. A method of constructing a cellular structure having nodes therein comprising:
   providing at least one truss layer comprised of at least one truss unit, at least one of said truss units being comprised of truss members;
   providing at least one panel in mechanical communication with said at least one truss unit of said at least one truss layer, said mechanical communication defines contact regions wherein said at least one truss unit is coupled to said at least one panel;
   said nodes being defined as intersections existing among any of said truss members and said nodes also being defined by said contact regions;
   providing at least one node pin, said at least one node pin spanning between two desired said nodes; and
   diffusion bonding at least one of said truss layer to said at least one panel, said bonding includes:
   applying heat, and
   applying force that results in said truss layer and said panel that are being bonded to be pressed together, said node pins provide support for the structure so as to concentrate or transmit the applied force onto said contact regions.

2. The method of claim 1, wherein the applied force onto said contact regions provides a node pressure, said node pressure being said applied force or portion of said applied force transmitted or concentrated upon said contact regions divided by the sum of the area of said contact regions.

3. The method of claim 1, further comprising removing at least one of said node pins.

4. The method of claim 1, further comprising providing at least a second panel in mechanical communication with said at least one truss layer distal from said initially provided panel.

5. The method of claim 1, further comprising providing at least a second truss layer in mechanical communication with said at least one truss layer, said mechanical communication defines contact regions wherein said at least one truss unit is coupled to said at least second truss layer.

6. The method of claim 5, further comprising providing at least a second panel in mechanical communication with said second truss layer distal from said initially provided panel.

7. The method of claim 5, further comprising providing at least a second panel in mechanical communication between said first truss layer and said second truss layer.

8. The method of claim 1, wherein said at least one truss layer and said at least one panel comprise at least one select material, wherein said select material comprise:
   titanium or titanium alloy or any combination thereof.

9. The method of claim 1, wherein said at least one truss layer and said at least one panel comprise at least one select material, wherein said select material comprise:
   at least one of: Ti-6Al-4V, TiAl, TiAlV, Ti, CP (Commercially pure) Ti, Ti-3Al-2.5V, Ti-5Al-2.5 Sn, Ti-6211, Ti-6242, Ti-8Al-1Mo-1V, Ti-11, TIMETAL 1100, IMI 230, IMI 417, IMI 679, IMI 685, IMI 829, IMI 834, Ti-5Al-6 Sn-2 Zr-1Mo-0.1 Si, Ti-17, Ti-6246, Ti-6Al-6V-2 Sn, Ti-7Al-4Mo, TIMETAL 62 S, SP-700, IMI 367, IMI 550, IMI 551, Corona 5, Ti-6-22-22-S, Ti-4Al-3Mo-1V, Ti-5Al-1.5Fe-1.4Cr-1.2Mo, Ti-5Al-2.5Fe, Ti-5Al-5 Sn-2 Zr-2Mo-0.25 Si, Ti-6.4Al-1.2Fe, Ti-2Fe-2Cr-2Mo, Ti-8Mn, Beta III, Beta C, Ti-10-2-3, Ti-13V-11Cr-3Al, Ti-15-3, TIMETAL 21 S, Beta CEZ, Ti-8Mo-8V-2Fe-3Al, Ti-15Mo-5 Zr, Ti-15Mo-5 Zr-3Al, Transage 129, Transage 134, Transage 175, Ti-8V-5Fe-1Al, Ti-16V-2.5Al, Ti-aluminides, Ti3Al alloys, Gamma TiAl alloys, and/or TiNi smart metal alloys (SMA's).

10. The method of claim 1, wherein said at least one truss layer and said at least one panel comprise at least one select material, wherein said select material comprise:
    ceramic, polymer, metal, metal alloy, and/or semiconductor or any combination or composites thereof.

11. The method of claim 1, wherein said heat provides a temperature environment in the range of about 2000° C. to about 3730° C.

12. The method of claim 1, wherein said heat provides a temperature environment in the range of about 200° C. to about 2000° C.

13. The method of claim 1, wherein said heat provides a temperature environment in the range of about 400° C. to about 1500° C.

14. The method of claim 1, wherein said heat provides a temperature environment in the range of about 650° C. to about 950° C.

15. The method of claim 1, wherein said heat provides a temperature environment in the range of about 100° C. to about 300° C.

16. The method of claim 1, wherein the applied node pressure is in the range of about 0.01 MPa to about 1000 MPa.

17. The method of claim 1, wherein the applied node pressure is in the range of about 0.01 MPa to about 500 MPa.

18. The method of claim 1, wherein the applied node pressure is in the range of about 1 MPa to about 100 MPa.

19. The method of claim 1, wherein the applied node pressure is in the range of about 0.1 MPa to about 100 MPa.

20. The method of claim 1, wherein at least one of said truss units have units have a geometrical shape of at least one of: tetrahedral, pyramidal, Kagome, cone, frustum, or combinations thereof and other non-limiting arrangements.

21. The method of claim 1, wherein at least one of said truss units have leg members.

22. The method of claim 21, wherein at least one of said leg members is hollow or solid or combination thereof.

23. A method of constructing a cellular structure having nodes therein comprising:
    providing at least one intermediate member;
    bending at least one of said intermediate member to form a truss layer comprised of at least one truss unit, at least one of said truss units being comprised of truss members;

providing at least one panel in mechanical communication with said at least one truss unit of said at least one truss layer, said mechanical communication defines contact regions wherein said at least one truss unit is coupled to said at least one panel;

said nodes being defined as intersections existing among any of said truss members and said nodes also being defined by said contact regions;

providing at least one node pin, said at least one node pin spanning between two desired said nodes; and diffusion bonding at least one of said truss layer to said at least one panel, said bonding includes:
applying heat, and
applying force that results in said truss layer and said panel that are being bonded to be pressed together, said node pins provide support for the structure so as to concentrate or transmit the applied force onto said contact regions.

24. The method of claim 23, wherein the applied force onto said contact regions provides a node pressure, said node pressure being said applied force or portion of said applied force transmitted or concentrated upon said contact regions divided by the sum of the area of said contact regions.

25. The method of claim 23, wherein at least one of said intermediate member comprises a porous, mesh, or aperture sheet.

26. The method of claim 25, wherein said pores or apertures of said intermediate member including a circular, square, rectangular, hexagonal, triangular, ellipsoidal, pentagonal, octagonal, or combinations thereof or other desired shape.

27. The method of claim 25, wherein
said pores or apertures are square, rectangular, parallelogram, or four sided shape whereby said bent intermediate member provides said array of said truss units whereby said truss units have a pyramidal shape.

28. The method of claim 25, wherein
said pores or apertures are hexagonal whereby said bent prefabricated layer provides said array of said truss units whereby said truss units have a tetrahedral shape.

29. The method of claim 23, wherein at least one of said intermediate member comprises an array of intersecting structural elements.

30. The method of claim 23, wherein said intermediate member further comprises a second array of intersecting structural elements stacked on top of said first array of intersecting structural elements.

31. The method of claim 23, wherein said intermediate member further comprises a second array of intersecting structural elements coupled to said first array of intersecting structural elements.

32. The method of claim 23, wherein at least one of said structure member comprises an array of braided textile structural elements.

33. The method of claim 23, wherein at least one of said structure member comprises an array of intersecting textile structural elements.

34. A method of constructing a cellular structure having nodes therein comprising:
providing at least one intermediate member;
providing at least one panel;
providing at least two node pins, said at least two node pins located between said intermediate member and said panel;
applying at least one level of force that results in:
said intermediate layer to be at least one of bent, stretched, and/or otherwise deformed or combination thereof into a desired geometry in response to at least in part to said node pins to form at least one truss layer, said at least one truss layer being in mechanical communication with said panel, said mechanical communication defines contact regions wherein said at least one truss unit is coupled to said at least one panel; and
diffusion bonding at least one of said truss layer to said at least one panel, said bonding includes:
applying said at least one level of force that results in said truss layer and said panel that are being bonded to be pressed together, said node pins provide support for the structure so as to concentrate or transmit the applied force onto said contact regions.

35. The method of claim 34, wherein said at least one level of applied force onto said contact regions provides a node pressure, said node pressure being said applied force or portion of said applied force transmitted or concentrated upon said contact regions divided by the sum of the area of said contact regions.

36. The method of claim 34, wherein said force for bending, stretching, or otherwise deforming is applied at least partially simultaneously during said force for bonding.

37. The method of claim 34, wherein said force for bending, stretching, or otherwise deforming is applied prior to said force for bonding.

38. The method of claim 34, wherein said force for bending, stretching, or otherwise deforming is applied partially after said force for bonding.

* * * * *